United States Patent [19]
Shiga et al.

[11] Patent Number: 5,475,276
[45] Date of Patent: Dec. 12, 1995

[54] ELECTRIC ROTATING MACHINE

[75] Inventors: Tsutomu Shiga, Nukata; Nobuyuki Hayashi, Nagoya; Masanori Ohmi, Anjo; Masami Niimi, Handa, all of Japan

[73] Assignee: Nippondenso Co., Ltd., Kariya, Japan

[21] Appl. No.: 386,318

[22] Filed: Feb. 9, 1995

[30] Foreign Application Priority Data

Oct. 5, 1994 [JP] Japan .................... 6-241141

[51] Int. Cl.⁶ .................... H02K 5/04; H02K 5/15; H02K 21/26
[52] U.S. Cl. .................... 310/154; 310/89
[58] Field of Search .................... 310/42, 89, 154

[56] References Cited

U.S. PATENT DOCUMENTS

| | | | |
|---|---|---|---|
| 3,083,310 | 3/1963 | Tweedy et al. | 310/154 |
| 3,555,320 | 1/1971 | Johnson | 310/89 |
| 4,795,932 | 1/1989 | Long | 310/154 |
| 4,851,727 | 7/1989 | Tanaka | 310/154 |
| 4,931,683 | 6/1990 | Gleixner et al. | 310/89 |
| 5,006,744 | 4/1991 | Archer et al. | 310/89 |
| 5,057,730 | 10/1991 | Yoshida | 310/89 |
| 5,073,738 | 12/1991 | Tang | 310/89 |

*Primary Examiner*—Clayton E. LaBalle
*Attorney, Agent, or Firm*—Cushman, Darby & Cushman

[57] ABSTRACT

An electric rotating machine with a lightweight and low cost yoke which has sufficient durability to be used under high vibration environments. A tubular yoke for electric rotating machine has a pair of lid portions laid on both axial ends of a tubular portion of a yoke. Through bolts for press-fitting the pair of lid portions from both sides tightens and fixes the pair of lid portions to the yoke. Concave portions extending from the outer circumference to the inner circumference are formed axially on the tubular portion. The center where the tightening force of the through bolts is applied is set between the hypothetical extension outer diameter and inner diameter of the tubular portion at the concave portion so that the tubular portion and the lid portions are tightened and fixed.

10 Claims, 4 Drawing Sheets

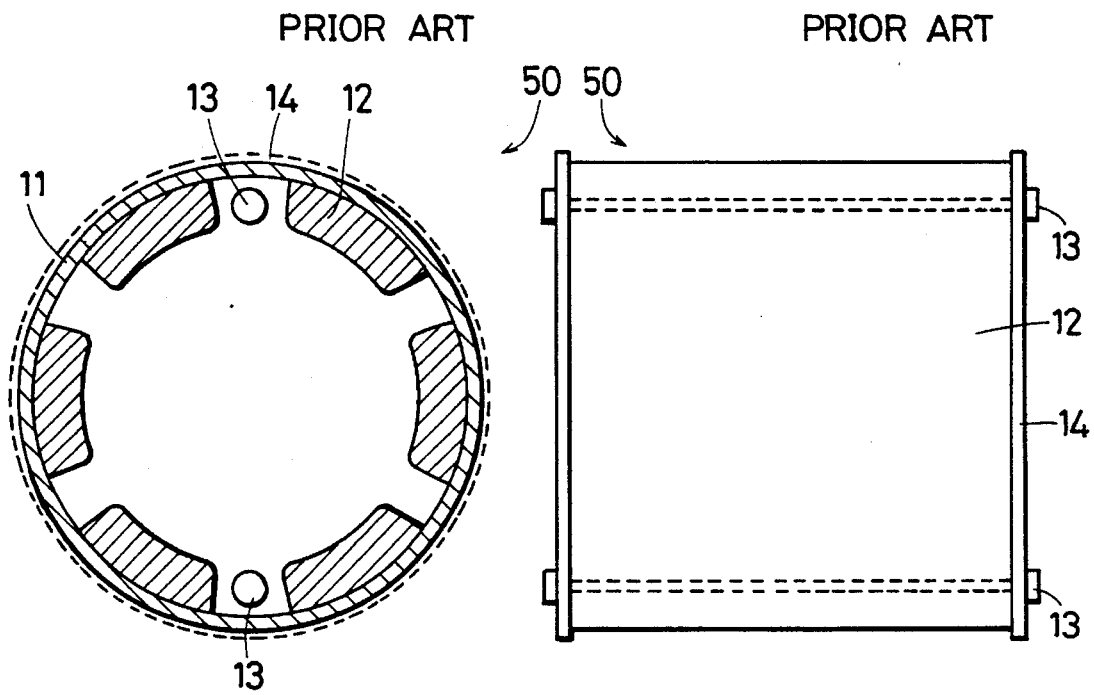
FIG.6A PRIOR ART
FIG.6B PRIOR ART
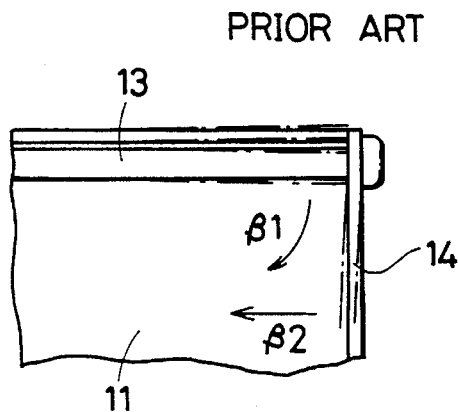
FIG.8 PRIOR ART

ELECTRIC ROTATING MACHINE

CROSS REFERENCE TO RELATED APPLICATION

This application is based upon and claims priority from the Japanese Patent Application No. 6-241141, the content of which is incorporated herein by reference.

BACKGROUND OF THE INVENTION

1. Field of the Invention

The present invention generally relates to an electric rotating machine incorporated in a starter for starting an engine. Particularly, the present invention relates to a yoke for electric rotating machine incorporated for starter motors, etc., which are used under high vibration conditions in vehicles, etc., and have permanent magnets used for a field magnetic pole.

2. Related Art

In recent years, starters using permanent magnets instead of the conventional winding type stator have become commonly used for electric rotating machine in order to reduce the weight of the electric rotating machine and to reduce production costs, etc. The configuration and assembly configuration of a yoke of this type of electric rotating machine are shown in FIGS. 5A, 5B, 6A and 6B. The yoke unit 50 acts as the outer shell of an electric rotating machine and is configured of a tubular yoke 11, and lid portions 14 which cover both axial ends of the tubular yoke 11. In the electric rotating machine using permanent magnets for the stator magnetic pole, multiple permanent magnets 12 are set in the inner circumference of the tubular yoke 11. The lid portions 14 set on both axial ends of tubular yoke 11 in the electric rotating machine are, as illustrated in FIG. 7, formed to be larger than the outer diameter of each tubular yoke 11 by the amount of the diameter of the through bolt explained later. The lid portions 14 on both ends of the tubular yoke 11, are tightened and fixed to,both ends of the tubular yoke 11 by the multiple through bolts 13 at a flange portion 15 that protrudes by the amount of the approximate diameter of the through bolts 13 onto the outer said of the outer diameter of the tubular yoke 11. In the electric rotating machine illustrated in FIG. 7, the diameter of the lid portion 14 is formed to approximately the same as the outer diameter of the tubular yoke 11. The lid portions 14 on both ends of the tubular yoke 11 are tightened and fixed to both ends of the tubular yoke 11 by the through bolts 13 that pass through the tubular yoke 11.

High performance ferrite magnets, etc., which have a cost lower than winding type stators are used for the permanent magnets 12 incorporated for the electric rotating machine illustrated in FIGS. 5A through 6B. These ferrite magnets have a residual flux density that is relatively low at 3000 G (gauss) to 5000 G, and thus the flux amount is small. Thus, when using these types of permanent magnets 12 for the stator of the electric rotating machine, the metallic tubular yoke 11 that congregates the field can be thin as compared to when a winding type stator is used. As the tubular yoke 11 can be thinner, the weight and cost of the electric rotating machine can be reduced.

However, in the case that this type of electric rotating machine is incorporated for applications such as vehicle starter motors and used under high vibration conditions, if the tubular yoke 11 which is thin as described above is used, the rigidity is low and the yoke unit 50 will resonate with the external vibration from the engine, etc. This can lead to damage of each electric rotating machine part such as loosening in the tightening and fixing with the through bolts 13, or can lead to abnormal wear in each part, thereby affecting the life of the electric rotating machine or starter. To prevent this type of disadvantages, the thickness of the tubular yoke 11 can be increased, or the number of through bolts 13 for tightening and fixing the lid portions 14 can be increased for example, but this leads to problems when trying to reduce weight or costs, etc. of the electric rotating machine.

Furthermore, in the above case, if the tubular yoke 11 and lid portions 14 are tightened and fixed to the inner circumference of the tubular yoke 11 at the flange portion 15 or lid portion 14 with through bolts 13 as shown in FIGS. 6A and 6B, a bend moment is applied to the lid portion 14 centering on the end portion of the tubular yoke 11. At this time, if the tightening force of the through bolts 13 is increased, the lid portion 14 may deform. For example, in the electric rotating machine illustrated in FIGS. 5A and 5B, a bend moment will be applied in the direction α1 as shown in FIG. 7, and the lid portion 14 will deform in the direction α2. In the yoke for electric rotating machine illustrated in FIGS. 6A and 6B, a bend moment will be applied in the direction β1 as shown in FIG. 8, and the lid portion 14 will deform in the direction β2. If the rigidity of the lid portion 14 is increased by using a material with a high rigidity for the lid portion 14, etc., the tubular yoke 11 formed by a thin steel plate, etc., with a low rigidity may be strained. Using material with a high rigidity or increasing the thickness to improve the rigidity of the lid portion 14 as described above will lead to problems When trying to reduce weight or costs, etc. of the electric rotating machine.

It has been difficult to secure the rigidity of the tubular yoke 11 and to sufficiently utilize the tightening force of the through bolts 13 when assembling onto the yoke 11 for the electric rotating machine that incorporates a thin steel plate tubular yoke for reducing weight and costs.

SUMMARY OF THE INVENTION

It is an object of the present invention, therefore, to provide an electric rotating machine that can realize a light weight and low cost, and secure a sufficient durability to be used in a high vibration environment.

Accordong to the present invention, concave portions in the axial direction are formed on a cylindrical yoke. These concave portions function as ribs. Thus, even if the tubular portion is formed of thin steel plates, etc., a sufficient rigidity can be achieved. The assembly of the yoke for electric rotating machine and lid portion is done with through bolts laid on the concave portion. By setting the center where the tightening force of these through bolts is utilized between the inner diameter and outer diameter of the tubular portion that penetrates the concave portion, the compression force applied on the tubular portion when tightening and fixing with through bolt is applied on the center axial direction of the extension of hypothetical circle of the tubular portion. In other words, the moment generated in radial direction of tubular yoke due to tightening force of through bolt can be suppressed, and deformation of the tubular yoke and lid portion by the tightening force can be prevented. This allows the tubular yoke for electric rotating machine and the lid portion to be securely tightened with the through bolts.

Preferably, by forming projection portions in the radial outer circumference side along the axial direction at the intersection of the concave portion and the tubular yoke, a stabilized tightening force can be achieved by pressing surface of the head portion of the through bolts. The concave portion is effective for mounting permanent magnets inside the yoke, thereby improving the assembly properties.

BRIEF DESCRIPTION OF THE DRAWINGS

In the accompanying drawings:

FIGS. 6A and 6B are cross-sectional and side views illustrating the other conventional yoke for electric rotating machine;

FIG. 8 is a partial side view illustrating a part of the conventional yoke for electric rotating machine of FIGS. 6A and 6B when tightened and fixed.

DETAILED DESCRIPTION OF THE PREFERRED EMBODIMENTS

The first embodiment of the present invention will be described with reference to FIGS. 1 through 4.

Figure 1:
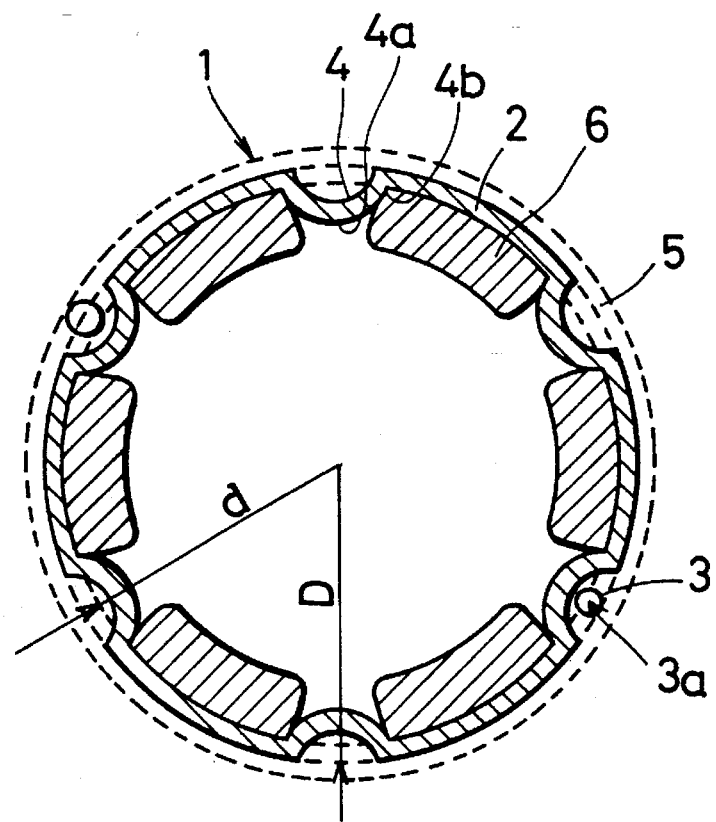
FIG. 1 is a circumferential cross-sectional view illustrating the first embodiment of a yoke for an electric rotating machine according to the present invention.
Figure 2:
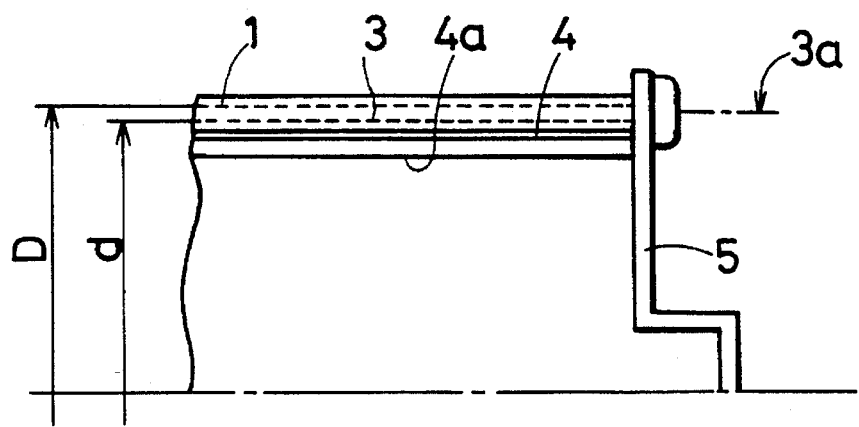
FIG. 2 is an axial side view illustrating the yoke for electric rotating machine shown in FIG. 1.

FIG. 1 is a circumferential cross-sectional view of electric rotating machine (excluding armature) according to the embodiment of the present invention and FIG. 2 is an axial side view of the same.

As shown in FIGS. 1 and 2, an electric rotating machine 1 is configured of a tubular yoke 2 formed of a tubular metal material, and lid portions 5 which cover both axial ends of the tubular yoke 2.

Multiple concave portions 4 in the axial direction of the tubular yoke 2 are formed on the outer surface of the tubular yoke 2. These concave portions 4 are formed in an approximate semicircle shape toward the radial inner circumference of the tubular yoke 2. Permanent magnets 6 are fixed onto the inner circumference of the tubular yoke 2 with adhesive, etc., as field magnetic pole of the electric rotating machine 1. These permanent magnets 6 are positioned between the adjacent two of the convex portions 4a on the inner circumference of the tubular yoke 2, i.e., on the rear side of the concave portions 4. In other words, the permanent magnets 5 are positioned on the base portion 4b of the convex portion 4a and then fixed. This improves the assembly process of the electric rotating machine.

The lid portions 5 cover both ends of the tubular yoke 2. Each lid portion 5 is formed to be a specified value in diameter larger than the diameter of the tubular yoke 2. In other words, the lid portion 5 has a diameter in which through holes 3 for passing through bolts 3 described later can be formed.

The two lid portions 5 configured on both axial ends of the tubular yoke 2 are tightened and fixed in the axial direction of the tubular yoke 2 with the through bolts 3 as shown in FIG. 2. These through bolts 3 are arranged so that the axial center 3a of the hole 3 lies between the hypothetical extension inner diameter d and the hypothetical extension outer diameter D of the tubular yoke 2. In other words, the center 3a of the tightening force of the through bolts 3 has substantially the same diameter as the outer diameter D in the tubular yoke 2.

Figure 4:
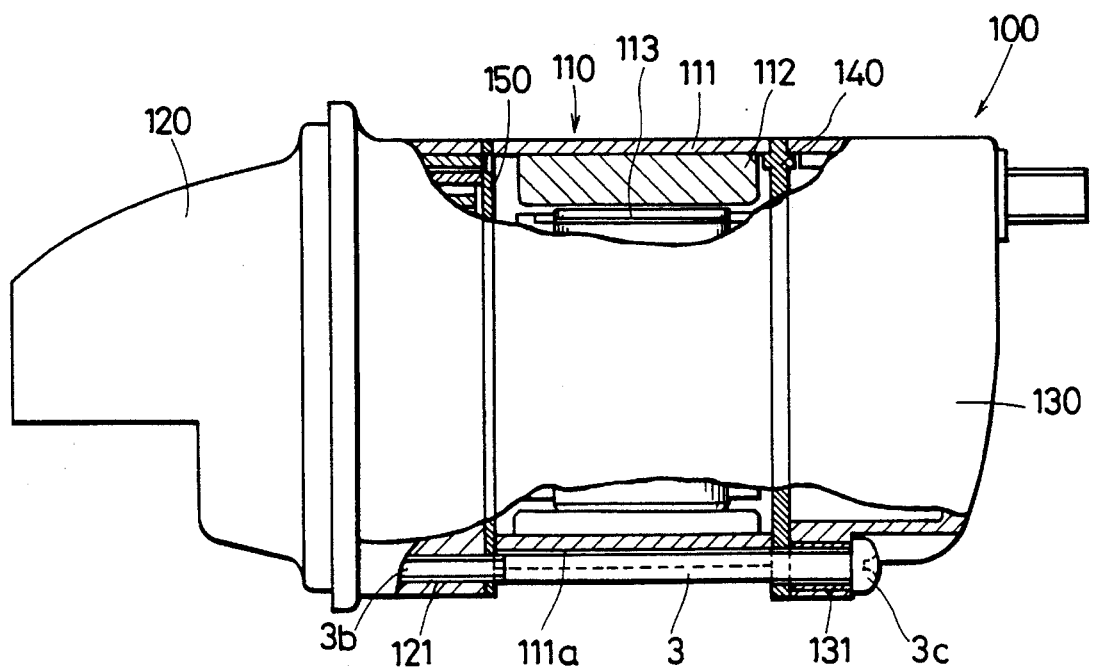
FIG. 4 is a partial cross-sectional side view of a vehicle starter incorporating the yoke according to the embodiment of the present invention.
Figure 5A:
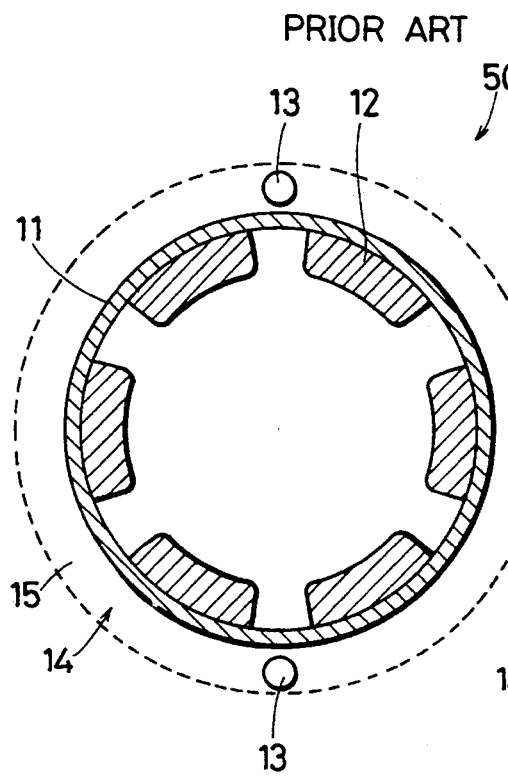
FIGS. 5A and 5B are cross-sectional and side views illustrating one conventional yoke for electric rotating machine.
Figure 5B:
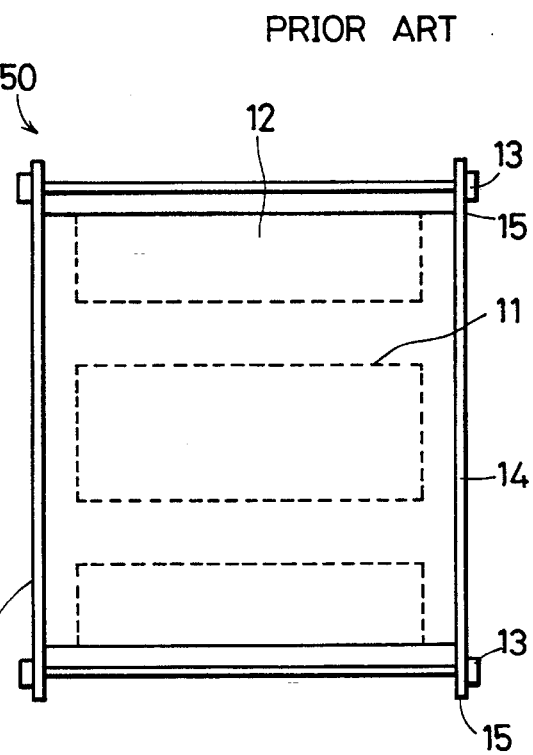
Figure 7:
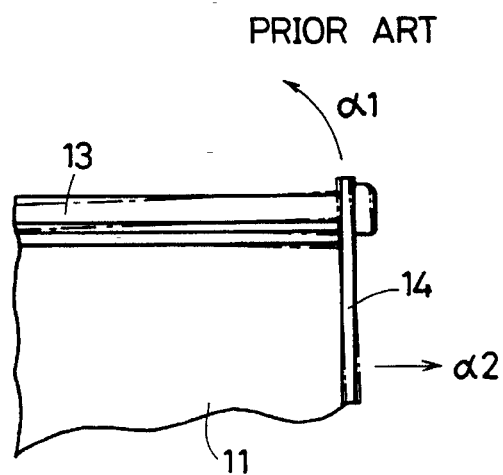
FIG. 7 is a partial side view illustrating a part of the conventional yoke for electric rotating machine of FIGS. 5A and 5B when tightened and fixed.

FIG. 4 illustrates an example of a starter 100 for vehicles incorporating therein the electric rotating machine configured as discribed above. This starter 100 is configured of a starter motor 110, housing 120 and end frame 130 that acts as the lid portion attached at both axial ends of a yoke 111 of starter motor 100. Magnets 112 are fixed on the inner circumference of the yoke 111, and an armature 113 is rotatably set inside the inner circumference of the magnets 112. Concave portions 111a extending radially inwardly are formed on the yoke 111 to correspond to the multiple concave portions 4a in FIG. 1. A pinion (not illustrated) that engages with a ring gear of an engine (not illustrated) is set in the housing 120, and female screw portion 121 through which a male screw portion 3b at the end of the through bolt 3b is screwed in is formed. A magnet switch (not illustrated) to conduct electric power to the starter motor 110 is stored in the end frame 130. Through holes 131 through which the through bolts 3 are inserted and of which the head portion 3c directly contacts are formed on the end frame 130. A brush holding plate 140 is disposed for holding brushes (not illustrated) used to conduct power to the armature 113 of the starter motor 110 and is supported between the yoke 111 and end frame 130. A motor wall 150 is held between the yoke 111 and housing 120.

The end frame 130 and housing 120 are set on both axial ends of the yoke 111 via the brush holding plate 140 and motor wall 150, respectively. The male screw portion 3b on the tip of the through bolt 3 is passed through the through hole 131 on the end frame 130, and screwed into the male screw portion 121 of the housing 120 to securely fix the end frame 130 and housing 120 to the yoke 111.

This type of starter 110 directly receives the vibration of the engine, etc., as it is placed extremely close to the vehicle engine. Thus, the load applied by the vibration onto the yoke 111 is large, and a sufficient rigidity and fixing force when assemblying is required. As described above, the concave portions 4 are uniformly formed in the axial direction on the outer circumference of the tubular yoke 2. These concave portions 4 act as the rib of the tubular yoke 2, and allow a sufficient rigidity even for the tubular yoke 2 formed with a thin steel plate.

The axial center 3a of the through-bolt 3 is set between the hypothetical extension inner diameter d and hypothetical extension outer diameter D of the tubular yoke 2 at the concave portion 4. Thus, the bend likely to be caused on the lid portion 5 by the tightening force between the inner diameter d and outer diameter D of the yoke 2 when tightening the through-bolt 3 to be eliminated. In other words, the tubular yoke 2 only receives the compression force in the axial direction when the through-bolt 3 is tightened. Therefore, materials with an especially high rigidity or an increased thickness do not need to be used for the lid portion 5. The tightening force of the through-bolt 3 can be applied to the yoke 2 in the direction and at the part having the highest rigidity when tightening and fixing the lid portion 5 and tubular yoke 2. Thus, the tightening and fixing can be done with a sufficiently strong load using the through-bolt 3.

As an additional effect, as part of the diameter of the through-bolt 3 is set to be hidden inside the concave portion 4, the amount that it projects radially from the outer circumference of the tubular yoke 2 is small, and the size of the electric rotating machine can be reduced. Furthermore, the concave portion 4 acts as the positioning mechanism for the through-bolt 3 when tightening and fixing with through-bolt 3, thereby contributing to the improved assembly process.

As a thin steel plate can be used for the tubular yoke 2, and each yoke 2 can be tightened and fixed with a sufficient strength, the weight and cost of the electric rotating machine can be reduced and the anti-vibration properties can be improved. In other words, even if the lightweight and low cost electric rotating machine is used in the starter in a high vibration environment, sufficient reliability can be provided.

Figure 3:
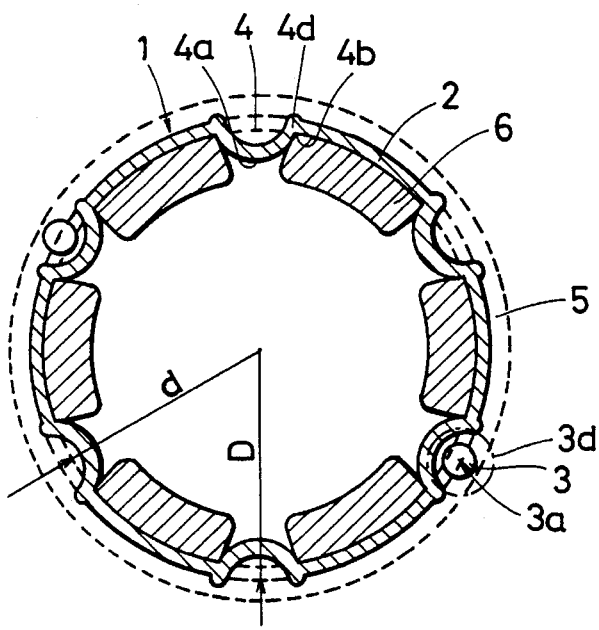
FIG. 3 is a cross-sectional view illustrating the second embodiment of the yoke for electric rotating machine according to the present invention.

As shown in FIG. 3, projection portions 4d which rise around the junction between the tubular portion and the concave portion 4 in the radial direction at a uniform height from the outer circumference of the tubular portion can be formed. When the yoke 2 is tightened and fixed with the through-bolt 3, a retainer surface 3d of the head portion of the through-bolt 3 can receive the tightening force not only at the axial end portion of the tubular yoke 2 but also at the axial end portion of the projection portion 4d. Thus, the tubular yoke 2 can withstand the high tightening force of the through-bolt 3.

If the axial direction ends of the concave portion 4 of the tubular yoke 2 contact and the end frame 130 and housing 120 directly without the brush holding plate 140 and motor wall 150, the axial center 3a of the through bolt 3 only needs to be set toward the concave portion 4 inside the hypothetical extension outer diameter D of the tubular yoke 2 in the concave portion 4. In other words, even if the axial center 3a of the through-bolt 3 is set inside the hypothetical inner diameter d of the tubular yoke 2, the end frame 130 and housing 120 will directly contact with the axial direction end of the concave portion 4 of the tubular yoke 2, and the tightening force will be received by the axial direction end of the concave portion 4.

As described above, according to the present invention, an electric rotating machine with a yoke which is light-weight and low cost while having sufficient durability to be used under high vibration environments can be provided.

What is claimed is:

1. An electric rotating machine comprising:

a generally tubular yoke having a tubular portion;

permanent magnets fixed inside said tubular yoke as field magnetic poles;

a pair of lid portions laid on both axial ends of said tubular portion of said yoke; and through bolts press-fitting said pair of lid portions from said both axial ends to tighten and fix said pair of lid portions to said yoke, wherein concave portions are formed axially on said tubular portion, and wherein an axial center of said through bolts is set between hypothetical extensions of an outer diameter and an inner diameter of said tubular portion at said concave portions.

2. The electric rotating machine according to claim 1, wherein each of said concave portions is formed in an approximate semicircle shape, and wherein said through bolts are positioned outside and on said concave portions.

3. The electric rotating machine according to claim 2, wherein each of said concave portions has a uniform projection portion extending axially along said tubular portion at a junction with said tubular portion.

4. The electric rotating machine according to claim 1, wherein each of said permanent magnets is placed between adjacent two of said concave portions and at an inner circumference of said tubular portion.

5. The electric rotating machine according to claim 1, wherein said electric rotating machine is mounted on a vehicle and is used as a starter for starting an engine.

6. An electric rotating machine comprising:

a generally tubular yoke having a tubular portion;

permanent magnets attached to an inner circumference of said tubular portion;

a pair of lid portions laid on both axial ends of said tubular portion of said yoke;

through bolts press-fitting said pair of lid portions from said both axial ends to tighten and fix the pair of lid portions to said yoke; and concave portions formed radially inwardly on said tubular portion and extending axially, wherein an axial center of said through bolts is set on said concave portion inside of a hypothetical extension outer diameter of said tubular portion at said concave portion, and wherein concave end portion of said tubular portion and each of said lid portions are tightened and fixed to directly contact each other.

7. An electric rotatig machine comprising:

a yoke shaped generally in a tubular form and having a plurality of concave portions which extend axially and radially inwardly;

a pair of lids shaped generally in a disk form to cover axial ends of said yoke, at least one of said lids having a plurality of holes at positions where said concave portions face; and a plurality of through bolts passing through said holes and received on said concave portions, said through bolts tightening said lids axially toward said yoke, an axial center of said bolts being positioned inside an outer diameter of said tubular yoke.

8. An electric rotating machine according to claim 7, wherein said through bolts have respective heads, and wherein said heads are placed adjacently to said concave portions so that tightening force of said through bolts is applied axially to said concave portions through said lids.

9. An electric rotating machine according to claim 8, further comprising:

permanent magnets each disposed inside said yoke and between adjacent two of said concave portions.

10. An electric rotating machine according to claim 9, further comprising:

projections extending radially outwardly from end portions of each of said concave portions.

* * * * *